United States Patent
Wahl et al.

(10) Patent No.: US 7,756,260 B2
(45) Date of Patent: Jul. 13, 2010

(54) METHOD FOR PROVIDING FEATURES TO THE USER OF A TELEPHONE, A CENTRAL UNIT AND A TELECOMMUNICATION SYSTEM THEREFOR

(75) Inventors: Stefan Wahl, Schwieberdingen (DE); Volker Laible, Stuttgart (DE); Klaus Satzke, Tamm (DE)

(73) Assignee: Alcatel, Paris (FR)

( * ) Notice: Subject to any disclaimer, the term of this patent is extended or adjusted under 35 U.S.C. 154(b) by 1183 days.

(21) Appl. No.: 11/356,120

(22) Filed: Feb. 17, 2006

(65) Prior Publication Data

US 2006/0198503 A1 Sep. 7, 2006

(30) Foreign Application Priority Data

Mar. 4, 2005 (EP) .................................. 05290510

(51) Int. Cl.
*H04M 1/00* (2006.01)
*H04M 1/60* (2006.01)
*H04M 9/00* (2006.01)

(52) U.S. Cl. ........................ 379/165; 379/156; 379/171; 370/352

(58) Field of Classification Search ................ 379/156, 379/157, 164, 165, 167.01, 171–173, 224, 379/227, 237, 350, 424, 92.03, 92.04, 93.05, 379/93.06; 370/352

See application file for complete search history.

(56) References Cited

U.S. PATENT DOCUMENTS

| | | | |
|---|---|---|---|
| 6,047,060 A | 4/2000 | Federov et al. | |
| 2002/0196923 A1 | 12/2002 | Donnelly | |
| 2003/0076817 A1* | 4/2003 | Han | 370/352 |
| 2004/0240432 A1* | 12/2004 | Ying et al. | 370/352 |
| 2006/0072546 A1* | 4/2006 | Chen | 370/352 |

* cited by examiner

*Primary Examiner*—Quoc D Tran
(74) *Attorney, Agent, or Firm*—Carmen Patti Law Group, LLC

(57) ABSTRACT

The invention concerns a method for providing features to the user of a telephone (HSA1, . . . HSAn, HSS1, . . . HSSm) that is connected to a central unit (CU) whereby, if said telephone (HSA1, . . . HSAn, HSS1, . . . HSSm) is currently not interconnected via the central unit (CU), said telephone (HSA1, . . . HSAn, HSS1, . . . HSSm) notifies the central unit (CU) at least about certain kinds of user activities, in case of such notification the central unit (CU) checks whether it is currently interconnected to another telephone assigned to the same subscriber as said notifying telephone (HSA1, . . . HSAn, HSS1, . . . HSSm) and in case of the existence of such interconnection, the notifying telephone (HSA1, . . . HSAn, HSS1, . . . HSSm) is interconnected in parallel to this interconnection, and if said notifying telephone (HSA1, . . . HSAn, HSS1, . . . HSSm) is not a telephone for digital communication, the other telephone is a telephone for digital communication.

7 Claims, 1 Drawing Sheet

US 7,756,260 B2

METHOD FOR PROVIDING FEATURES TO THE USER OF A TELEPHONE, A CENTRAL UNIT AND A TELECOMMUNICATION SYSTEM THEREFOR

The invention is based on a priority application EP 05290510.6 which is hereby incorporated by reference.

FIELD OF THE INVENTION

The invention relates to a method for providing features to the user of a telephone that is connected to a central unit wherein if said telephone is currently not interconnected via the central unit, said telephone notifies the central unit at least about certain kinds of user activities, in case of such notification the central unit checks whether it is currently interconnected to another telephone assigned to the same subscriber as said notifying telephone and in case of the existence of such interconnection, the notifying telephone is interconnected in parallel to this interconnection, and if said notifying telephone is not a telephone for digital communication, the other telephone is a telephone for digital communication, a central unit for interconnecting telephones, wherein the central unit comprises means for receiving a notification of a user activity from a telephone assigned to a dedicated subscriber and not interconnected via the central unit, means for evaluating said notification, means for checking whether an interconnection is established to another telephone assigned to said dedicated subscriber and means for interconnecting in parallel said other telephone in case of the existence of such interconnection and a telecommunication system comprising at least one central unit, a quantity of at least one telephone where at least one telephone of said quantity is a telephone for digital communication, wherein the central unit comprises means for receiving a notification of a user activity from a telephone assigned to a dedicated subscriber and not interconnected via the central unit, means for evaluating said notification, means for checking whether an interconnection is established to another telephone assigned to said dedicated subscriber and means for interconnecting in parallel said other telephone in case of the existence of such interconnection.

BACKGROUND OF THE INVENTION

A user owning several analogue telephones all assigned to the same telephone number and connected in parallel e.g. to the Plain Old Telephone System (POTS) can easily hand over a call from one interconnected (here: engaged in a call or a session) telephone to another telephone currently not interconnected simply by off hooking the other telephone. That means in case of analogue telephones, features can be provided even for telephones that are currently not interconnected by means of very simple user actions like e.g. off-hooking the telephone.

With data packet networks like IP networks (IP=Internet Protocol) becoming more and more common, the use of data-packet-based telephones like e.g. the so-called SIP telephones (SIP=Session Initiation Protocol) that apply SIP as signaling protocol is strongly increasing. However, two SIP telephones can not be configured and applied in a way that they behave as two analogue telephones connected in parallel. Applying the SIP protocol specifications, it is e.g. not possible that a SIP telephone is interconnected in parallel to an already existing interconnection simply by off hooking the SIP telephone, i.e. for a SIP telephone, no features can be provided by means of very simple user actions as it is the case for analogue telephones. Therefore, additional actions by the user, as e.g. pressing a sequence of buttons, are required for the handover of a call from one SIP telephone to another SIP telephone, with both telephones being assigned to the same telephone number. SIP telephones expect e.g. that the user always presses a kind of enter button at the telephone, if the dialed number shall be transmitted or an interconnection shall be established. For non-technical persons or for persons who are used to hook off another telephone in order to continue the call, it is not acceptable to first study a technical description e.g. to learn the procedure to handover the interconnection to another telephone. This procedure might even be interpreted by the user as a malfunction.

SUMMARY OF THE INVENTION

The object of the invention is to propose a method for providing features to the user of a telephone that is currently not interconnected.

This object is achieved by a method for providing features to the user of a telephone that is connected to a central unit wherein if said telephone is currently not interconnected via the central unit, said telephone notifies the central unit at least about certain kinds of user activities, in case of such notification the central unit checks whether it is currently interconnected to another telephone assigned to the same subscriber as said notifying telephone and in case of the existence of such interconnection, the notifying telephone is interconnected in parallel to this interconnection, and if said notifying telephone is not a telephone for digital communication, the other telephone is a telephone for digital communication, a central unit for interconnecting telephones, wherein the central unit comprises means for receiving a notification of a user activity from a telephone assigned to a dedicated subscriber and not interconnected via the central unit, means for evaluating said notification, means for checking whether an interconnection is established to another telephone assigned to said dedicated subscriber and means for interconnecting in parallel said other telephone in case of the existence of such interconnection and a telecommunication system comprising at least one central unit, a quantity of at least one telephone where at least one telephone of said quantity is a telephone for digital communication, wherein the central unit comprises means for receiving a notification of a user activity from a telephone assigned to a dedicated subscriber and not interconnected via the central unit, means for evaluating said notification, means for checking whether an interconnection is established to another telephone assigned to said dedicated subscriber and means for interconnecting in parallel said other telephone in case of the existence of such interconnection.

The main idea of the invention is, that whenever a certain user action, as e.g. hooking off the telephone or pressing a button on the telephone, is performed on a digital or data-packet-based telephone like e.g. a SIP telephone that is currently not interconnected to the telecommunication network via a central unit, a notification of this action is sent to the central unit within the telecommunication network. The notification of the user action is preferably compliant to the SIP protocol in case the notifying telephone is a SIP telephone and can e.g. comprise the SIP message NOTIFY which is generated and transmitted to the central unit by the SIP telephone. The central unit in turn is on receipt of this notification evaluating said notification and providing features for the notifying telephone according to the notification. The central unit e.g. can check on receipt of a dedicated notification whether it is presently interconnected to another telephone assigned to the same subscriber as the notifying telephone and in case of the existence of such an interconnection, the reporting telephone will be interconnected in parallel to the already existing interconnection.

For the implementation of the invention in most of the cases no additional device is necessary as the functionality of the central unit can be implemented as a software module e.g. in an exchange like a Private Branch Exchange (PBX). Also, only small changes of the software modules e.g. in the SIP telephones have to be performed in order to adapt the SIP telephones according to the invention.

Further developments of the invention can be gathered from the dependent claims and the following description.

BRIEF DESCRIPTION OF THE DRAWING

In the following the invention will be explained further making reference to the attached drawing.

DESCRIPTION OF THE DRAWING

Figure 1:
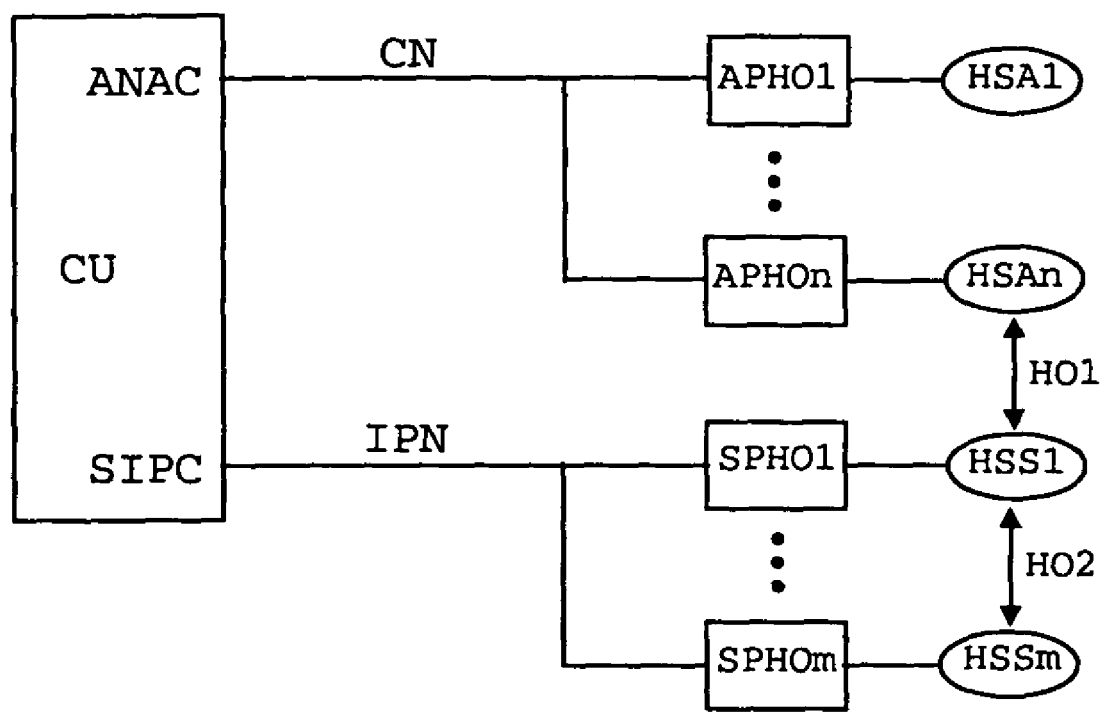
FIG. 1 schematically shows a telecommunication system with a central unit and several telephones with handsets according to the invention for providing features to the user of a telephone according to the invention.

The telecommunication system according to the invention depicted in FIG. 1 comprises a control unit CU, several analoguetelephones APHO1-APHOn with dedicated handsets HSA1-HSAn and several data-packet-based, Integrated Services Digital Network (ISDN) or Digital Enhanced Cordless Telecommunications (DECT) telephones or base stations SPHO1-SPHOm, in the following for the sake of simplicity all called digital telephones, with dedicated handsets HSS1-HSSm.

In another embodiment according to the invention, the telecommunication system may not comprise analogue telephones APHO1-APHOn but only digital telephones SPHO1-SPHOm. Each handset HSA1-HSAn is connected to its dedicated analogue telephone APHO1-APHOn through a wireline or wireless connection and each handset HSS1-HSSm is connected to its dedicated digital telephone SPHO1-SPHOm also through a wireline or wireless connection.

The analogue telephones APHO1-APHOn are all connected to an interface for analogue connections ANAC of the central unit CU via a communication network CN. The communication network CN may e.g. be realized similar to the Plain Old Telephone System (POTS) used for the interconnection of analogue telephones. Therefore, this communication network CN may comprise additional network nodes like switches, gateways and the like necessary for establishing interconnections which are not depicted in FIG. 1 for the sake of simplicity. In FIG. 1 by way of example the telephone lines coming from the analogue telephones APHO1-APHOn are all multiplexed onto one telephone line which is linked to the interface for analogue connections ANAC, but the telephone lines coming from the analogue telephones APHO1-APHOn could also be linked separately to different interfaces for analogue connections ANAC.

The digital telephones SPHO1-SPHOm are all connected to an interface for digital communication SIPC of the central unit CU via a digital network IPN like e.g. an Internet Protocol network. The Internet Protocol network IPN may e.g. be the Internet or a so-called Local Area Network (LAN). Therefore, the digital network IPN may comprise additional network nodes like routers, gateways and the like necessary for establishing interconnections which are not depicted in FIG. 1 for the sake of simplicity. In FIG. 1 by way of example the lines coming from the digital telephones SPHO1-SPHOm are all multiplexed onto one line which is linked to the interface for digital communication SIPC, but the lines coming from the digital telephones SPHO1-SPHOm could also be linked separately to different interfaces for digital communication SIPC.

The central unit CU may be connected to further telecommunication networks and/or digital networks by means of additional interfaces. For the sake of simplicity none of these interfaces and connections is depicted in FIG. 1.

The handsets HSA1-HSAn and HSS1-HSSm that have a wireline or wireless connection to their dedicated analogue telephone APHO1-APHOn and their dedicated digital telephone SPHO1-SPHOm respectively are customary handsets that you have got to take off the hook before you can establish an interconnection or are mobile handsets on which you have got to push one or several buttons before you can establish an interconnection.

In a preferred embodiment the handsets HSS1-HSSm which are dedicated to digital telephones SPHO1-SPHOm and/or said digital telephones SPHO1-SPHOm have the capability to receive, process and send messages that are in compliance with the SIP protocol.

The analogue telephones APHO1-APHOn can be of arbitrary kind with wireline or wireless connection to the dedicated handsets HSA1-HSAn.

The digital telephones SPHO1-SPHOm and/or the handsets HSS1-HSSm used to carry out the invention must provide the functionality to send a message to the control unit indicating a certain user action like e.g. off hooking the telephone or pushing a button even if the digital telephone SPHO1-SPHOm is currently not interconnected. Therefore, in the digital telephones SPHO1-SPHOm either an already existing functionality to send a message to the control unit indicating a certain user action like e.g. "SIP message at offhook" provided from Pingtel must be activated or such a functionality must be implemented by means of software changes in the digital telephones SPHO1-SPHOm.

The central unit CU comprises the functionality of an exchange like e.g. a Private Communication Exchange (PCX) or a Private Branch Exchange (PBX) and/or the functionality of a SIP proxy. Additionally, the central unit CU comprises means for receiving a notification of a user activity from one of the handsets HSA1-HSAn or HSS1-HSSm or from one of the telephones APHO1-APHOn or SPHO1-SPHOm assigned to a dedicated subscriber and not interconnected with the central unit CU, means for evaluating said notification and means for providing features to the user of one of the telephones HSA1-HSAn or HSS1-HSSm.

In a preferred embodiment the central unit CU comprises furthermore means for storing messages.

In the following, by way of example the method according to the invention is described in detail making reference to FIG. 1.

A user of the analogue telephone APHOn that is not interconnected performs a certain kind of user activity like e.g. hooking off the headset HSAn or pressing a button on the headset HSAn or the analogue telephone APHOn. A notification according to this user activity is generated within the analogue telephone APHOn or the headset HSAn and transmitted over the communication network CN. The notification is received at the interface for analogue communication ANAC of the central unit CU.

In the central unit CU, the notification is evaluated and according to this notification features are provided to the user of the analogue telephone APHOn like e.g. the analogue telephone APHOn will be interconnected parallel to an already existing interconnection of the digital telephone SPHO1 assigned to the same subscriber as the notifying analogue telephone APHOn In a preferred embodiment, a handover HO1 of the interconnection from the digital telephone SPHO1 to the analogue telephone APHOn will be performed.

In a preferred embodiment, said certain kind of user activity is off-hooking the notifying analogue telephone APHOn and the notification is based on measuring the loop current through the analogue telephone APHOn by the central unit CU.

In another embodiment, a user of the digital telephone SPHO1 that is not interconnected performs a certain kind of user activity like e.g. hooking off the headset HSS1 or pressing a button on the headset HSS1 or the analogue telephone SPHO1. A notification according to this user activity is generated within the telephone SPHO1 or the headset HSS1 and transmitted over the digital network IPN. The notification is received at the interface for digital communication SIPC of the central unit CU.

In the central unit CU, the notification is evaluated and according to this notification, features are provided to the user like e.g. the digital telephone SPHO1 will be interconnected parallel either to an already existing interconnection of the analogue telephone APHOn assigned to the same subscriber as the notifying digital telephone SPHO1 or to an already existing interconnection of the digital telephone SPHOm assigned to the same subscriber as the notifying digital telephone SPHO1.

In a preferred embodiment, a handover HO1 of the interconnection from the analogue telephone APHOn to the digital telephone SPHO1 and a handover HO2 of the interconnection from the digital telephone SPHO1 to the digital telephone SPHOm respectively will be performed.

In another embodiment, the features that are provided to the user can comprise other vendor or user specific reactions like e.g. the establishment of 3-site conferences or the recording of messages.

In a preferred embodiment, the notifying digital telephone SPHO1 is a SIP telephone and the notification that is generated within the telephone SPHO1 or the headset HSS1 is accomplished by sending a SIP message, like e.g. the NOTIFY message, from the notifying SIP telephone SPHO1 or the headset HSS1 to the central unit CU.

The invention claimed is:

1. A method for providing features to a subscriber of a first telephone that is connected to a central unit comprising the steps of:

notifying the central unit of user activities if the first telephone is not interconnected via the central unit, wherein notifying the central unit comprises the first telephone sending a notification to the central unit where the first telephone is assigned to the subscriber;

checking whether the central unit is currently interconnected to a second telephone upon receiving the notification by the central unit, wherein the second telephone is assigned to the subscriber; and interconnecting in parallel the first telephone to the interconnection between the second telephone and the central unit if one of the first telephone and the second telephone is a telephone for digital communications.

2. A method according to claim 1, further comprising a handover of a call from said second telephone to the first telephone.

3. A method according to claim 1, wherein the first telephone is a SIP telephone, and the notification is accomplished by sending a SIP message from the first telephone to the central unit.

4. A method according to claim 1, wherein the first telephone is an analogue telephone and if the notification is off-hooking the first telephone, the notification is based on measuring the loop current through the first telephone by the central unit.

5. A central unit for interconnecting telephones, wherein the central unit comprises means for receiving a notification of a user activity from a telephone assigned to a dedicated subscriber and not interconnected via the central unit, means for evaluating said notification, means for checking whether an interconnection is established to another telephone assigned to said dedicated subscriber and means for interconnecting in parallel said other telephone in case of the existence of such interconnection.

6. A central unit according to claim 5, wherein the central unit comprises means for storing messages.

7. A telecommunication system comprising at least one central unit, a quantity of at least one telephone where at least one telephone of said quantity is a telephone for digital communication, wherein the central unit comprises means for receiving a notification of a user activity from a telephone assigned to a dedicated subscriber and not interconnected via the central unit, means for evaluating said notification, means for checking whether an interconnection is established to another telephone assigned to said dedicated subscriber and means for interconnecting in parallel said other telephone in case of the existence of such interconnection.

* * * * *